United States Patent [19]

Pantelis et al.

[11] Patent Number: 4,746,577

[45] Date of Patent: May 24, 1988

[54] OPTICAL WAVEGUIDES CONTAINING COMPOSITIONS HAVING NON-LINEAR OPTICAL PROPERTIES

[75] Inventors: Philippos Pantelis, Ipswich; Graham J. Davies, Woodbridge, both of England

[73] Assignee: British Telecommunications Public Limited Company, London, England

[21] Appl. No.: 17,837

[22] Filed: Feb. 24, 1987

Related U.S. Application Data

[62] Division of Ser. No. 808,995, Dec. 16, 1985.

[30] Foreign Application Priority Data

Dec. 14, 1984 [GB] United Kingdom ................ 8431682

[51] Int. Cl.$^4$ ........................................... C08L 27/16
[52] U.S. Cl. ...................................... 428/421; 524/99; 524/103; 524/104; 524/240; 524/241; 524/254; 524/260; 524/520; 524/545; 524/546; 524/516

[58] Field of Search ................ 428/421; 524/99, 103, 524/104, 240, 241, 260, 520, 545, 546, 516, 254

[56] References Cited

U.S. PATENT DOCUMENTS

| | | | |
|---|---|---|---|
| 3,665,206 | 5/1972 | Bergman, Jr. et al. | 307/88.3 |
| 3,970,362 | 7/1976 | Laliberte | 428/421 |
| 4,199,698 | 4/1980 | Bethea et al. | 307/425 |

*Primary Examiner*—John C. Bleutge
*Assistant Examiner*—David W. Woodward
*Attorney, Agent, or Firm*—Nixon & Vanderhye

[57] ABSTRACT

Non linear optical compositions contain a vinylidene fluoride copolymer and an additive having molecular optoelectronic activity, e.g. methyl-N-(2,4-dinitrophenyl)-alaninate. Poled films derived from the composite display optoelectronic activity. There is a marked contrast with known techniques in which single crystals are utilized. The compositions are used to make laminates which display good waveguide properties.

17 Claims, 1 Drawing Sheet

MNA
2−methyl−4−nitroaniline

MAP
Methyl−N−(2,4−dinitrophenyl)−alaninate

OPTICAL WAVEGUIDES CONTAINING COMPOSITIONS HAVING NON-LINEAR OPTICAL PROPERTIES

This is a division of application Ser. No. 808,995 filed Dec. 16, 1985.

This invention relates to optical compositions, e.g. to compositions which have non-linear optical properties.

BACKGROUND OF THE INVENTION

The use of optical frequencies for telecommunications and other data processing applications has given rise to a need for optical devices which generate and/or modify and/or control signals at optical frequencies. Such devices include optical components, i.e. active and/or passive components. Examples of active components include signal generators, modulators, demodulators and amplifiers. A secondary harmonic generator is an example of a passive component. In addition to the optical components a device often includes electrical components for controlling the active optical components, connectors for both optical and electrical signals and substrates for supporting the other items.

Recent developments have provided these devices wherein the optical components are single crystals with suitable properties, e.g. U.S. Pat. No. 4,199,698 relates to the use of single crystals of 2-methyl-4-nitroaniline in non-linear devices.

It will be appreciated that there is widespread use of devices based on compositions having favourable non-linear properties. This invention relates to a new category of such materials.

According to this invention a composition with non-linear optical properties contains a vinylidene fluoride polymer and an additive having molecular non-linear optical activity.

BRIEF DESCRIPTION OF THE DRAWING

The invention is further described with reference to the attached drawings in which.

DETAILED DESCRIPTION OF THE INVENTION

Figure 1:
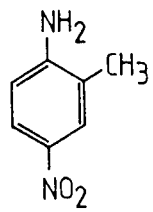
FIG. 1 is the additive 2-Methyl-4 nitro-aniline having non-linear properties.

These compositions are suitable for forming the optical components of optical devices (either as pre-formed shaped articles or otherwise). In any case the composition is poled to develop the non-linear properties; if desired stretching may be employed to enhance molecular orientation and hence enhance the effect of the poling.

The additives are organic compounds the molecules of which possess a number of electrons incorporated within π-molecular orbitals. The molecules have auxochromes which, in addition to increasing the size of the π-molecular orbitals, cause the π-electrons to move non-linearly on the application of an external electric field. As such, the electrical polarisability of the molecules must be described by an equation which includes linear, quadratic and cubic terms, namely:

$$\mu_e - \mu_g = \alpha E + \beta E^2 + \gamma E^3$$

wherein:

$\mu_e$ = dipole moment on application of field E
$\mu_g$ = dipole moment in absence of field
E = applied electric field (V/M)
$\alpha$ = linear coefficient
$\beta$ = quadratic coefficient
$\gamma$ = cubic coefficient, and
$\mu_e - \mu_g$ = polarisability.

When $\beta$ and/or $\gamma$ are/is large, e.g. $\beta$ greater than $10^{-30}$ esu and/or $\gamma$ greater than $4 \times 10^{-35}$ esu as measured at 1.06 μm a number of important effects on radiation of optical frequency are observed.

Compounds suitable for use as the additive include:
1. 2-Methyl-4-nitro-aniline
2. 2'-Dimethylamino-5'-nitroacetanilide
3. 1-(5-Nitro-2-pyridyl)pyrrolidin-2-ylmethanol
4. 5'-Nitro-2'-pyrrolidin-1-ylacetanilide
5. 1-(4-Nitrophenyl)pyrrolidin-2-ylmethanol
6. Methyl-N-(2,4-dinitrophenyl)-alaninate
7. 1-Phenylethyl(5-nitro-2-pyridyl)amine In the literature these compounds are often designated as follows:
1. MNA
2. DAN
3. PNP
4. PAN
5. NPP
6. MAP
7. MBA-NP $\beta$-values for the compounds listed above as items 1 and 6 are given below:

| ITEM | $\beta$ |
| --- | --- |
| 1 | $17 \times 10^{-30}$ esu |
| 6 | $22 \times 10^{-30}$ esu |

The vinylidene fluoride polymer may be a homopolymer or a copolymer with up to 80 mole% of low molecular weight (e.g. up to 100) unsaturated fluorocarbons as comonomers, e.g. monofluoroethylene, trifluoroethylene and tetrafluoroethylene.

The compositions typically contain 10 to 95% of the polymer and 5 to 50% of the additive.

In some cases difficulties arise due to inadequate compatibility between the vinylidene fluoride polymer and the additive. These difficulties may be reduced by incorporating an auxiliary polymer component into the composition. The auxiliary component enhances mixing, e.g. by serving as a solvent. Concentrations of up to 60% of the auxiliary component are acceptable when necessary but it is preferred to use concentrations below 40%.

Polymers derived from monomers with molecular weights below 150 and containing one vinyl unsaturation and one carbonyl group are particularly suitable as the auxilliary component. Preferred comonomers have a formula selected from:
 (a) R"—CO—X—R'
 (b) R'—CO—X—R"
 (c) Y—CO—Z—R"
 wherein
R' is selected from —CH$_3$ and —C$_2$H$_5$;
R" is selected from —CH=CH$_2$ and —C(CH$_3$)=CH$_2$;
X is a bridge selected from a direct bond, —O—, —NH— and —N(CH$_3$)—; and
Y and Z are linked together so as to form a pyrrolidone ring.

Poly(methylacrylate), poly(methylmethacrylate), poly(vinylacetate), poly(N-vinyl-2 pyrrolidone) and Poly(NN dimethylacrylamide) are particularly suitable.

As a preliminary to incorporation in a device the compositions according to the invention may be converted into shaped articles, e.g. fibres or films having a dimension in the range 0.1 to 1000 μm, especially 1 to 200 μm. The shaped articles are poled and, if desired, orientated e.g. monoaxially orientated by mechanical stretching. Electrodes may be applied to the shaped article, e.g. by a metal sputtering process or by vacuum evaporation.

Alternatively, the composition may be deposited on a substrate (avoiding the production of a shaped article as a separate entity). Where this route is adopted the poling will usually be applied after the deposition.

Compounds which have a high β coefficient do not have a centre of symmetry. In the single crystal from the activity associated therewith may not be fully realised because the crystal lattice may locate asymmetric molecules into positions wherein one molecule is symetrically located with respect to a different molecule whereby the crystal has a centre of symmetry even though its individual molecules do not. Thus, this invention produces the required non-linear properties by orientating the additive by electrical ordering or poling of the additive together with its polymeric host, whereby the internal electrical field set up in the piezoelectric polymeric host acts to keep the non-linear optical additive in a preferred alignment and so overcome the effects of thermal randomisation.

This invention, which is defined in the claims, includes not only the compositions and shaped articles produced therefrom but also non-linear devices such as parametric amplifiers produced therefrom.

Several compositions according to the invention will now be described by way of example.

The reagents used in these examples were:

Additives

Figure 2:
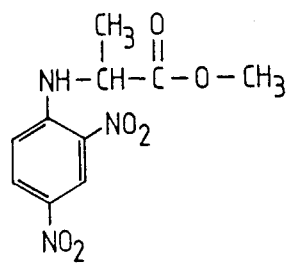
FIG. 2 is the additive methyl-N-(2,4-dinitrophenyl)-alaninate.

The additives used in the examples were:
2-methyl-4-nitroaniline (conveniently designated MNA), and Methyl-N-(2,4-dinitrophenyl)-alaninate (conveniently designated MAP). The structural formula of MNA is given in FIG. 1 and the structural formula of MAP is given in FIG. 2.

Vinylidenefluoride polymers

These polymers were obtained under the registered trade marks "KYNAR" 7200 and "FORAFLON". "KYNAR" 7200 is a copolymer of 30 mole% tetrafluoroethylene and 70 mole% vinylidenefluoride. It had a melting point (by differential scanning calorimetry) of 130° C. approx. "FORAFLON" was designated copolymer 7 030 and it contained 30 mole% trifluoroethylene and 70 mole% vinylidenefluoride.

Auxiliary Component

The auxiliary component used in the examples was a commercially available poly(methylmethacrylate), designated PMMA, with melting point 130° C.

EXAMPLE 1

(Solution Processing)

Three of the reagents specified above, namely MNA, "KYNAR" copolymer 7 030 and PMMA, were separately dissolved in acetone to give three 10% stock solutions.

Portions of the three stock solutions were mixed to give the solutions, identified by the codes S1, S2, S3 and S4, having the compositions defined in Table 1. (In each case 10 mls of the solution were produced.)

TABLE 1

| CODE | MNA wt | % | PMMA wt | % | KYNAR wt | % |
|---|---|---|---|---|---|---|
| S1 | 0.3 g | 30 | 0.6 g | 60 | 0.1 g | 10 |
| S2 | 0.3 g | 30 | 0.5 g | 50 | 0.2 g | 20 |
| S3 | 0.3 g | 30 | 0.4 g | 40 | 0.3 g | 30 |
| S4 | 0.3 g | 30 | 0.3 g | 30 | 0.4 g | 40 |

In Table 1, the figures in the columns headed % denote the percentage by weight of the relevant component based on the total film, i.e. after removal of the solvent.

Each of these solutions was cast into a film through a gap of approximately 200 μm. In each case the additive (i.e. the MNA) was uniformly dissolved in the blend of the vinylidene fluoride polymer (i.e. the KYNAR 7200) and the auxiliary (i.e. the PMMA).

EXAMPLE 2

(Solution Processing)

In this example several films were formed by solution processing from acetone; laminates were formed from these films and these laminates are described in Example 3.

All these films were of two components, namely a vinylidene fluoride polymer and an additive having non-linear linear properties.

The vinylidene fluoride polymer was "FORAFLON" copolymer 7 030. The additive was MAP.

Films were prepared by dissolving the two components in acetone to give a solution with a total solid content of 30% w/w.

The solution was spread into a gas plate using a automatic film spreader (ICI design made by Sheen Instruments). The cast solutions were allowed to dry at ambient temperature (about 20° C.) in the absence of draughts for 24 hours. The resulting film was peeled from the glass.

The peeled films were stretched (using an Instron tester) at 16° C. at 5 cm/min and the stretched films corona poled for 15 secs by placing the film between two sets of corona discharge wires held at +10 KV and −10 KV, each spaced 1 cm from the film faces. Details of films prepared, including stretch ratio, thicknesses and relevant properties are given in Table 2.

TABLE 2

| MAP % | TRUE DRAW RATIO | THICKNESS μm | RI | YM | g31 |
|---|---|---|---|---|---|
| 0 | 5.2 | 17 | 1.398 | 12.4 | 2.20 |
| 2 | 4.6 | 17 | 1.405 | 12.8 | 1.46 |
| 4 | 4.9 | 20 | 1.413 | 10.1 | 2.56 |
| 6 | 4.7 | 21 | 1.416 | 7.1 | 5.38 |
| 8 | 4.5 | 22 | 1.419 | 7.6 | 6.81 |
| 10 | 4.6 | 23 | 1.423 | 6.0 | 8.98 |

(Notes on TABLE 3:-
RI means refractive index at 589.3 nm.
The refractive index was substantially constant over the band 450 to 650 nm.
YM means Young Modulus; the units are $10^8$ Nm$^{-2}$.
$g_{31}$ means piezoelectric coefficient; the units are $10^{-2}$ volts meter per newton.
% means by weight based on total film weight.
Before stretching the thickness of all the films was about 63 μm; the thickness given in Table 2 is the thickness after stretching.
The solutions were cast through a gap 600 μm wide.)

The refractive index column indicates that a light guiding structure can be achieved by laminating a film with a high concentration of additive between confining layers, e.g. films with a lower (or zero) concentration of additive. Examples of such laminates are provided in Example 3.

EXAMPLE 3

(3-layer laminates)

The films used to make the laminates were cast and poled as described in Example 2 but they were not stretched. All were 10 μm thick. The films used for the confining layers consisted of pure "FORAFLON" whereas the films used for the guiding layers contained the percentage (weight additive per total weight of film) specified in Table 3. The laminates were prepared by placing the guiding layer between two confining layers and compressing at 40° C. under 2.8 tonnes/cm². The outer surfaces were metalised to act as electrodes.

The laminates were tested and found to be effective wave guides. The refractive index (RI) of the guiding layer, measured in the first guiding mode in the laminate, is also given in Table 3.

TABLE 3

| GUIDING LAYER MAP % | RI |
|---|---|
| 1 | 1.408 |
| 2 | 1.412 |
| 3 | 1.413 |
| 4 | 1.416 |
| 5 | 1.417 |

EXAMPLE 4

(Waveguides)

In this example the waveguide was a laminate of two layers only, namely:
(a) a confining layer 7 μm thick with no additive.
(b) a guiding layer 5 μm thick with 3% w/w MAP.

It will be understood that air serves as one confining layer. The two layers were compressed together, as in Example 3, the poled at ±12 KV after lamination. The composite gave a loss of 6 dB cm$^{-1}$ at 633 nm wavelength.

What is claimed is:

1. A laminate having waveguide properties consisting of a light guiding layer enclosed between two confining layers in which the guiding layer is formed of a composition consisting essentially, in parts by weight based on the total composition, of:
   (A) 10% to 99.9% of a vinylidene fluoride polymer,
   (B) 0.1% to 50% of an additive that is an organic compound having non-linear optical properties, and
   (C) 0% to 60% of a polymeric auxiliary component material for enhancing the compatibility of components (A) and (B).

2. A laminate according to claim 1 in which the guiding layer contains 0.5 to 30% of additive.

3. A laminate according to claim 2 in which the guiding layer contains 1 to 20% of additive.

4. A laminate according to claim 1 in which the additive in the guiding layer has
   $\beta > 10^{-30}$ esu or
   $\gamma > 4 \times 10^{-35}$ esu or both.

5. A laminate according to claim 4 in which $\beta > 10^{-30}$ esu.

6. A laminate according to claim 1 in which component (A) in the guiding layer is a homopolymer of $CH_2=CF_2$ or a copolymer of $CH_2=CF_2$ and up to 80 mole %, based on the copolymer, of a different comonomer having the formula $C_2F_nH_{4-n}$ in which n is an integer from 1 to 4.

7. A laminate according to claim 6 in which the copolymer is of 75 mole % to 65 mole % vinylidene fluoride and 25% mole to 35% mole trifluoroethylene.

8. A laminate according to claim 1 in which the auxiliary component in the guiding layer is derived from monomeric molecules which contain one vinyl unsaturation and one carbonyl group and have a molecular weight below 150.

9. A laminate according to claim 8 in which each monomeric molecule has a formula selected from:
   (a) R"—CO—X—R'
   (b) R'—CO—X—R" or
   (c) Y—CO—Z—R"
   wherein
   R' is selected from —$CH_3$ or —$C_2H_5$
   R" is selected from —CH=$CH_2$ or —C($CH_3$)=$CH_2$;
   X is a bridge selected from a direct bond, —O—, —NH— or —N($CH_3$)—; and
   Y and Z are linked together so as to form a pyrrolidone ring.

10. A laminate according to claim 8 in which the auxiliary component is poly(methylacrylate), poly(methylmethacrylate), poly(vinylacetate), poly(N-vinyl-2-pyrrolidone) or Poly(NN dimethylacrylamide).

11. A laminate according to claim 1 in which the additive in the guiding layer is
    2-methyl-4-nitro-aniline
    2'-dimethylamino-5'-nitroacetanilide
    1-(5-nitro-2-pyridyl)pyrrolidin-2-ylmethanol
    5'-nitro-2'-pyrrolidin-1-ylacetanilide
    1-(4-nitrophenyl)pyrrolidin-2-ylmethanol
    methyl-N-(2,4-dinitrophenyl)-alaninate, or
    1-phenylethyl(5-nitro-2-pyridyl)amine.

12. A laminate according to claim 1 in which the guiding layer contains:
    (A) 80 to 90% of a vinylidene fluoride polymer; and
    (B) 20 to 1% of an additive having non-linear properties.

13. A laminate according to claim 12 in which item (A) is a copolymer containing 75 mole % to 65 mole % of vinylidene fluoride and 25% mole to 35% mole of comonomer having the formula $C_2F_nH(4-n)$ in which n is an integer from 1 to 4.

14. A laminate according to claim 13 in which item (B) is
    2-methyl-4-nitroaniline or
    methyl-N-(2,4-dinitrophenyl)-alaninate.

15. A laminate according to claim 1 in which wherein each confining layer is formed of a vinylidene fluoride polymer containing less additive than the guiding layer.

16. A laminate according to claim 1 in which the confining layer contains zero concentration of additive.

17. A laminate according to claim 1 in which the outer surfaces of the guiding layers are provided with electrodes.

* * * * *